United States Patent
Vajravel

(10) Patent No.: US 10,394,722 B1
(45) Date of Patent: Aug. 27, 2019

(54) MANAGING ALT-MODE INTERFACES OF A USB TYPE-C DEVICE

(71) Applicant: Dell Products L.P., Round Rock, TX (US)

(72) Inventor: Gokul Thiruchengode Vajravel, Rayasandra Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/057,649

(22) Filed: Aug. 7, 2018

(51) Int. Cl.
*G06F 13/10* (2006.01)
*G06F 13/42* (2006.01)

(52) U.S. Cl.
CPC ........ *G06F 13/102* (2013.01); *G06F 13/4282* (2013.01); *G06F 2213/0042* (2013.01)

(58) Field of Classification Search
CPC .................................................. G06F 13/102
See application file for complete search history.

(56) References Cited

U.S. PATENT DOCUMENTS

2013/0042028 A1* 2/2013 Yang .................. G06F 9/44505
710/13

* cited by examiner

*Primary Examiner* — Farley Abad
(74) *Attorney, Agent, or Firm* — Kirton McConkie; Brian Tucker

(57) ABSTRACT

A filter driver can be employed to manage the Alt-Mode interfaces of a USB Type-C device. The filter driver can be loaded on the device stack for the USB Type-C device to allow the filter driver to intercept and modify communications for determining which alternate modes the USB Type-C device supports. The filter driver can modify the communications based on administrative rules or policies which dictate the type of alternate modes that should be allowed within a particular user session. By modifying these communications, supported but not allowed alternate modes will not be made available.

20 Claims, 20 Drawing Sheets

MANAGING ALT-MODE INTERFACES OF A USB TYPE-C DEVICE

CROSS-REFERENCE TO RELATED APPLICATIONS

N/A

BACKGROUND

USB Type-C is a type of connector having 24 pins. In accordance with the USB 3.1 standard, some of these pins of the USB Type-C connector can be employed to implement Alternate Mode (or Alt-Mode). Alt-Mode references the fact that the pins can be used to implement non-USB (i.e., alternate) protocols such as DisplayPort and Thunderbolt 3 between the host and the device.

The present invention is generally directed to techniques for managing Alt-Mode interfaces of a USB Type-C device. These techniques can be implemented on a computing device when the USB Type-C device is locally connected as well as when the USB Type-C device is redirected. The following overview of USB device redirection will be given to provide context for how Alt-Mode interfaces of a redirected USB Type-C device can be managed. It is noted that much of this overview equally pertains to local connection scenarios, e.g., the building of the device stack.

USB device redirection is a technique performed in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment. For purposes of this application, device 240 can represent a biometric device such as a fingerprint scanner.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

FIG. 2A is largely the same as FIG. 2 but represents the architecture that would exist when a USB device is connected locally to a computing device 204. In this scenario, bus driver 230 (as opposed to virtual bus driver 260) will be loaded on computing device 204 and will sit at the bottom of the device stack for the locally connected USB device 240.

The USB interfaces of USB Type-C devices can be redirected in much the same manner as described above. However, even when the USB interfaces are redirected, the Alt-Mode interfaces are kept local. FIG. 3 illustrates an example of the client-side architecture that would exist when a USB Type-C device is redirected to server 104. As shown, the USB interfaces of device 240 will be redirected as described above causing device stack 280 to be loaded on server 104. In contrast, any Alt-Mode interfaces that device 240 supports will be retained locally such that a device stack 380 will be loaded on client 102. Device stack 380 will include an ACPI Bus driver 381a (e.g., acpi.sys), and the USB connector manager consisting of USB Type-C driver 381b (e.g., UcmUcsi.sys) and USB connector manager class extension 381c (e.g., the kernel mode UcmCx.sys or the user mode UcmCx.dll). In a non-redirection scenario, the same device stack 380 will be loaded on computing device 204 but device stack 280 will also be loaded on computing device 204 as shown in FIG. 3A. In short, a different device stack is employed to access the non-USB (Alt-Mode) interfaces of device 240.

ACPI bus driver 381a functions to implement the Advanced Configuration and Power Interface. Of relevance to this description, ACPI bus driver 381a supports commands for determining which, if any, alternate modes a USB device supports.

USB Type-C driver 381b implements the USB Type-C Connector System Software Interface (UCSI). The UCSI provides a standard way to generate the commands required to support a USB Type-C port including commands for determining which alternate modes are supported.

USB connector manager class extension 381c represents the operating-system provided classes that can be employed by a user-mode or kernel-mode component to interface with USB Type-C driver 381b.

When a USB Type-C device is connected locally or redirected to a computing device, the USB Type-C device will be initialized on the computing device. As part of this initialization, USB Type-C driver 381b will initiate requests for determining which alternate modes the USB Type-C device supports in accordance with the UCSI. If the USB Type-C device supports any alternate modes, USB Type-C driver 381b will report these modes so that the operating system or other components on the computing device can employ them to communicate with the USB Type-C device.

This ability to use an alternate mode to access the USB Type-C device creates security concerns. Although various techniques exist for blocking access to a USB device (e.g., USB lockdown and group policies), these techniques cannot be used to block an Alt-Mode interface because Alt-Mode interfaces are accessed via a different device stack and in a different manner.

BRIEF SUMMARY

The present invention extends to methods, systems, and computer program products for managing Alt-Mode interfaces of a USB Type-C device. A filter driver can be loaded on the device stack for a USB Type-C device to allow the filter driver to intercept and modify communications for determining which alternate modes the USB Type-C device supports. The filter driver can modify the communications based on administrative rules or policies which dictate the type of alternate modes that should be allowed within a particular user session. By modifying these communications, supported but not allowed alternate modes will not be made available.

In some embodiments, the present invention is implemented by a filter driver as a method for managing alternate modes of the USB Type-C device. Upon completion of a device control request that includes a command to obtain supported alternate modes of the USB Type-C device, the filter driver evaluates a response to the command. The filter driver determines that the response identifies one or more alternate modes that the USB Type-C device supports. For each alternate mode that the USB Type-C device supports, the filter driver determines whether the alternate mode is allowed. For any alternate mode that is determined to not be allowed, the filter driver removes the alternate mode from the response. The filter driver then passes the device control request up the device stack such that the response does not include any alternate mode that was determined to not be allowed.

In other embodiments, the present invention is implemented by a filter driver as a method for managing alternate modes of the USB Type-C device. The filter driver receives a device control request and determines that the device control request includes a command to obtain supported alternate modes of the USB Type-C device. In response, the filter driver registers to be called back upon completion of the device control request. Upon completion of the device control request, the filter driver compares the supported alternate modes that were obtained from the USB Type-C device to a policy defining alternate modes that are to be allowed. The filter driver removes one or more supported alternate modes based on the policy prior to passing the device control request up the device stack.

In other embodiments, the present invention is implemented by a filter driver as a method for managing alternate modes of the USB Type-C device. Upon completion of a device control request that includes a command to obtain supported alternate modes of the USB Type-C device, the filter driver evaluates a response to the command and determines that the response identifies multiple alternate modes that the USB Type-C device supports. The filter driver also determines that at least one of the supported alternate modes is not allowed and removes the at least one alternate mode from the response. The filter driver then passes the device control request up the device stack such that the response does not include the at least one alternate mode that was removed from the response.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term USB Type-C device should be construed as encompassing a USB device that includes at least one USB Type-C connector and that supports one or more alternate modes. This term should also be construed to encompass any subsequently developed USB connector types that support alternate modes (e.g., a future-developed connector type that is intended to replace the Type-C connector). Also, within the specification, the present invention will be described primarily in the context of a Windows implementation. However, the present invention can be implemented with other operating systems (e.g., Linux) in much the same way.

To manage alternate modes of a USB Type-C device, the present invention employs a filter driver that sits below the USB Type-C driver in the device stack. As indicated above, this USB Type-C driver can be any driver that implements the UCSI such as the Windows-provided UcmUcsi.sys driver. Because it sits below the USB Type-C driver (and above the USB Type-C driver's physical device object), the filter driver will be able to intercept device control requests that target a USB Type-C device that has been locally connected or redirected to the computing device on which the device stack is located.

Figure 1:
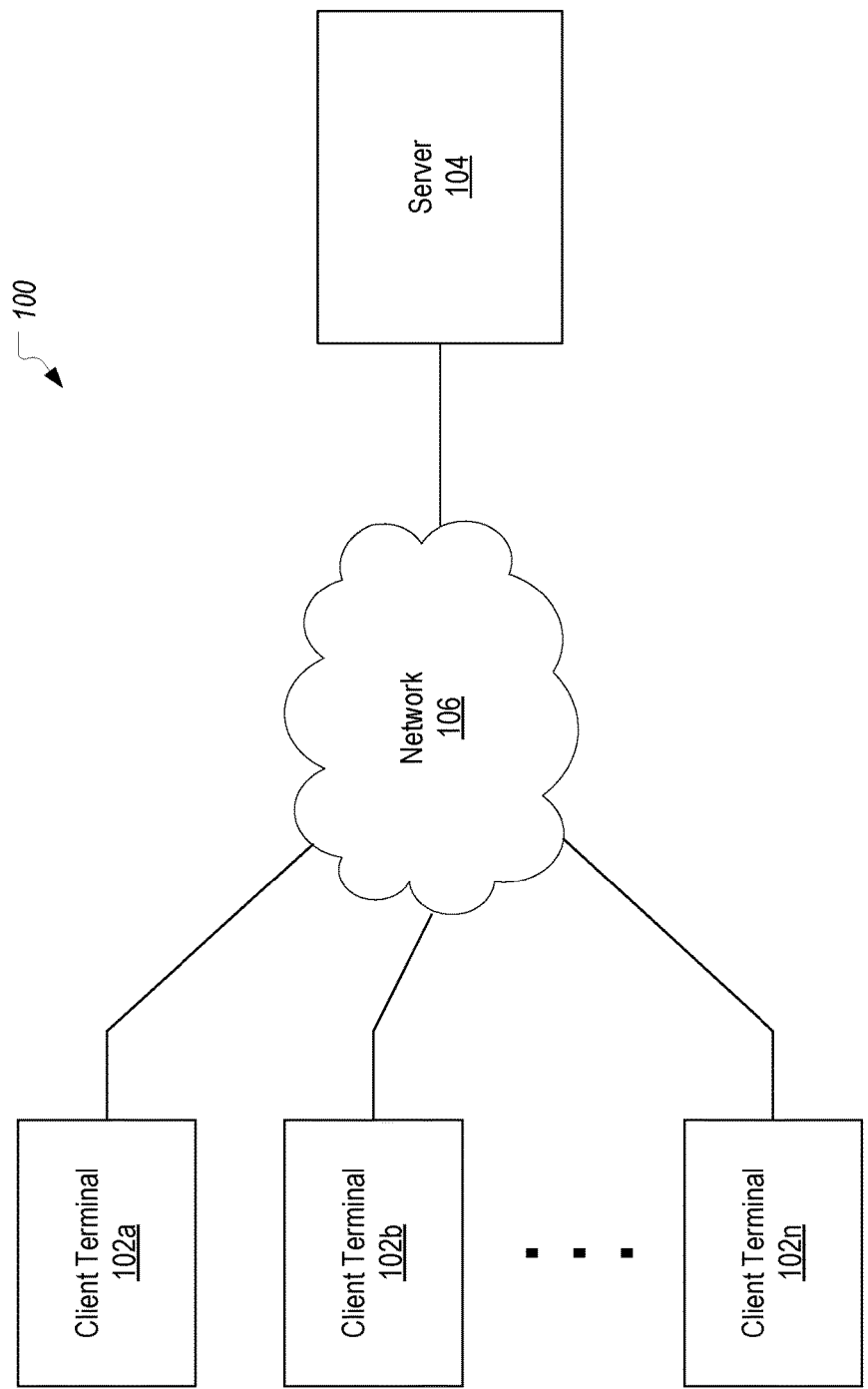
FIG. 1 illustrates an example computing environment in which the present invention can be implemented.
Figure 2:
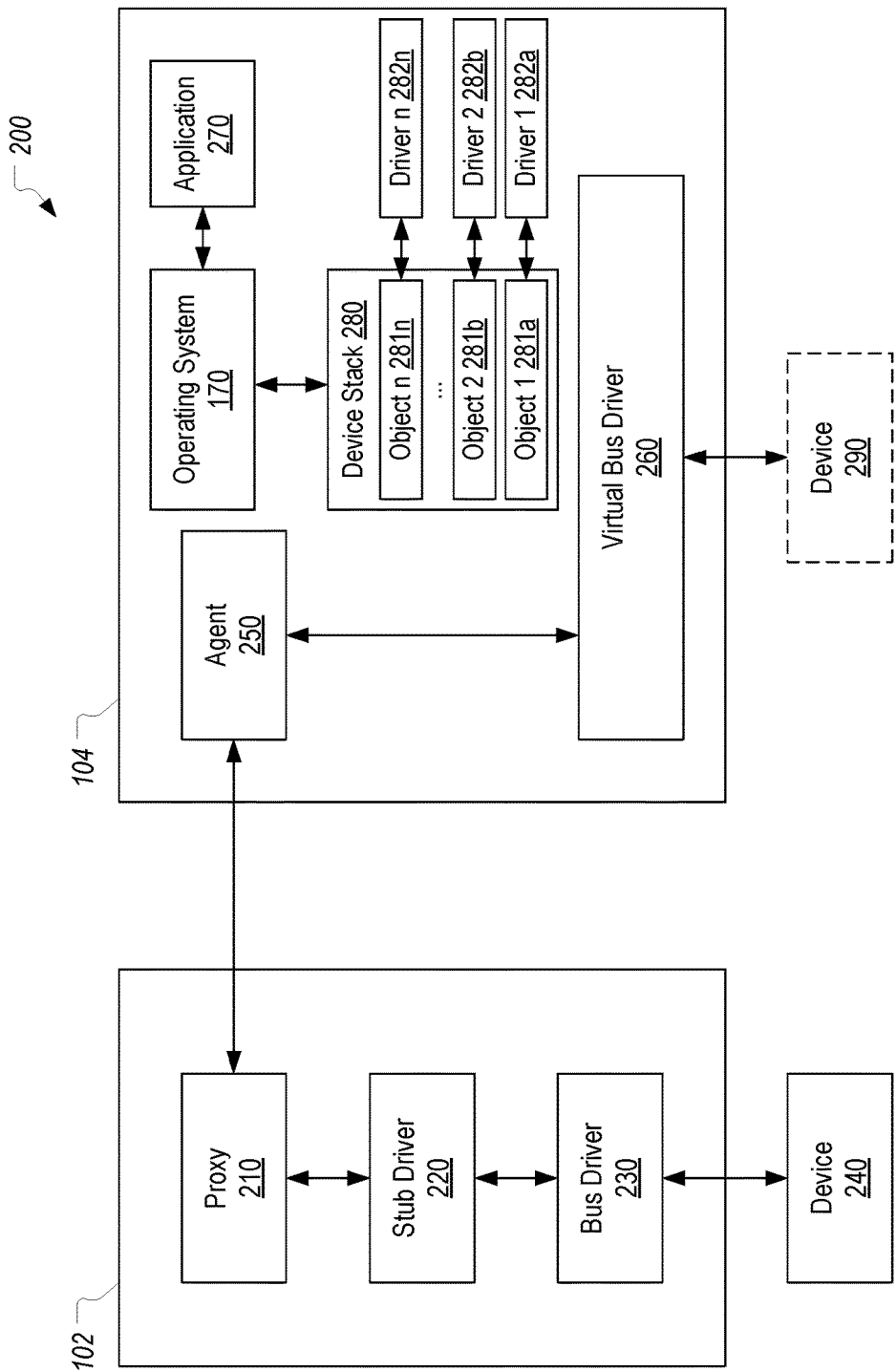
FIG. 2 illustrates a general architecture that may exist when a USB device is redirected from a client terminal to a server.
Figure 2A:
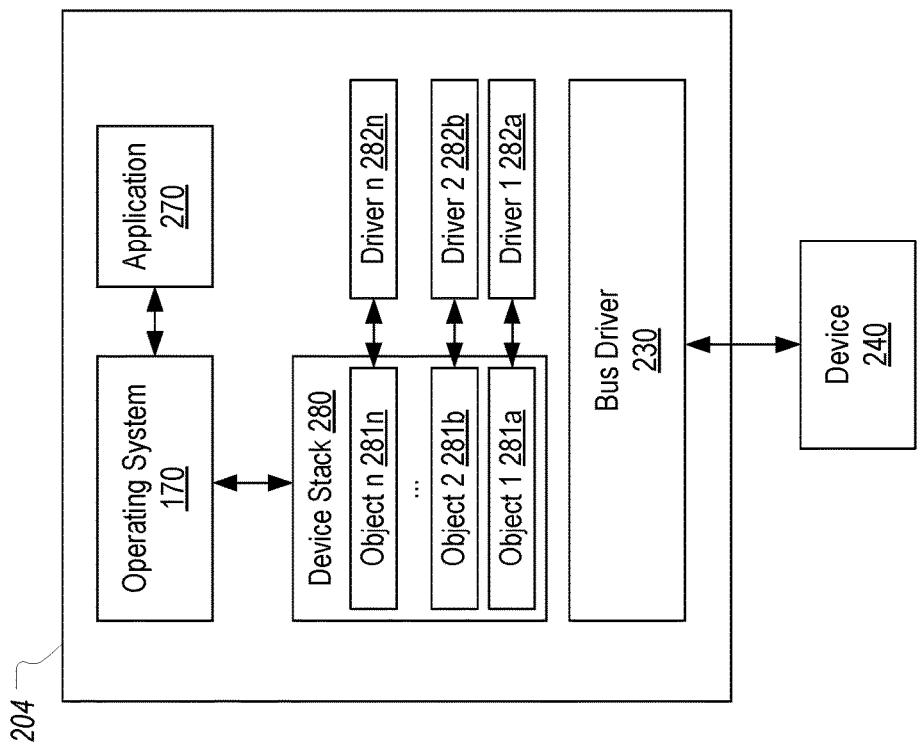
FIG. 2A illustrates a general architecture that may exist when a USB device is connected locally to a computing device.
Figure 3:
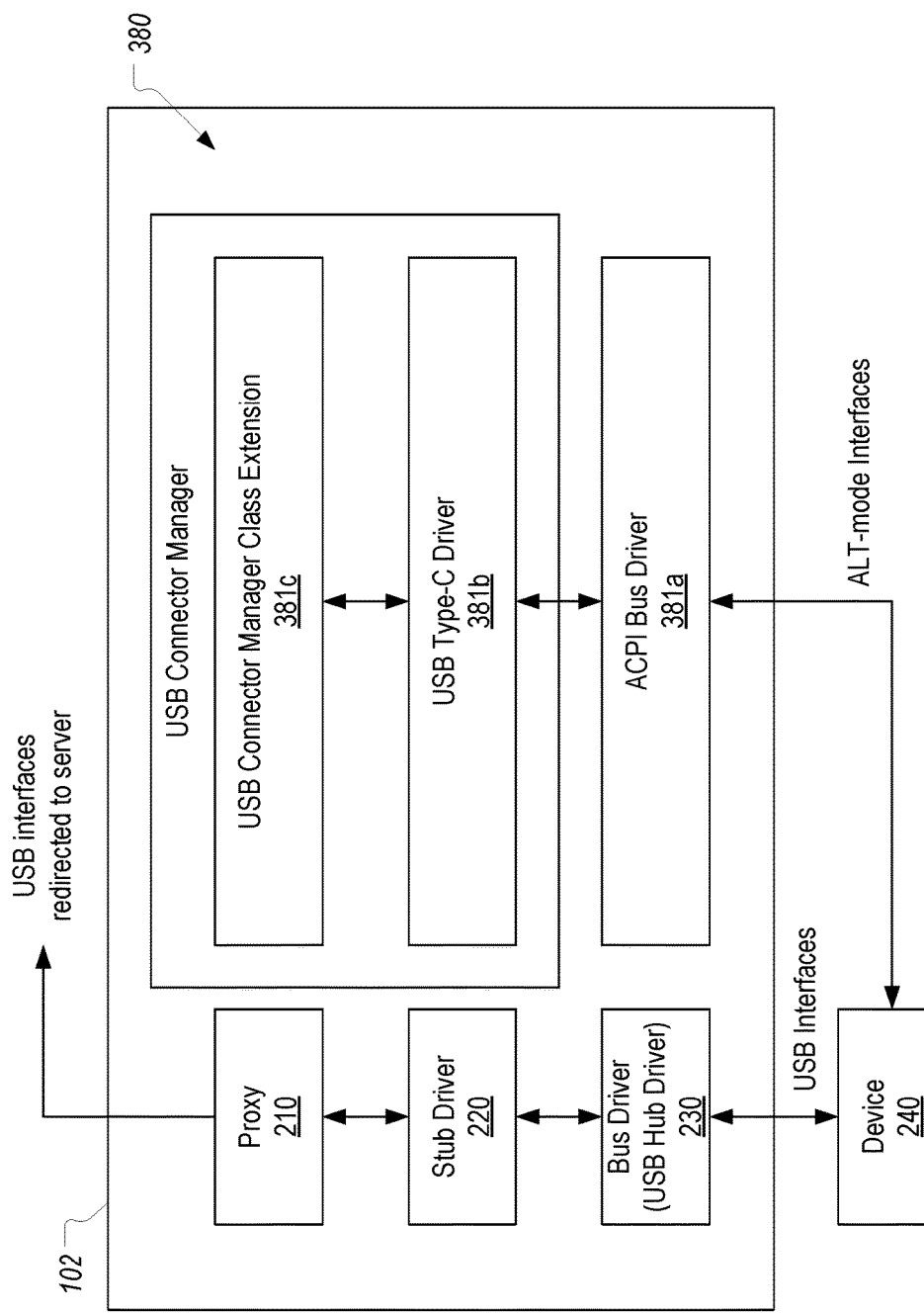
FIG. 3 is based on FIG. 2 but represents the client-side architecture that may exist when the redirected USB device is a USB Type-C device.
Figure 3A:
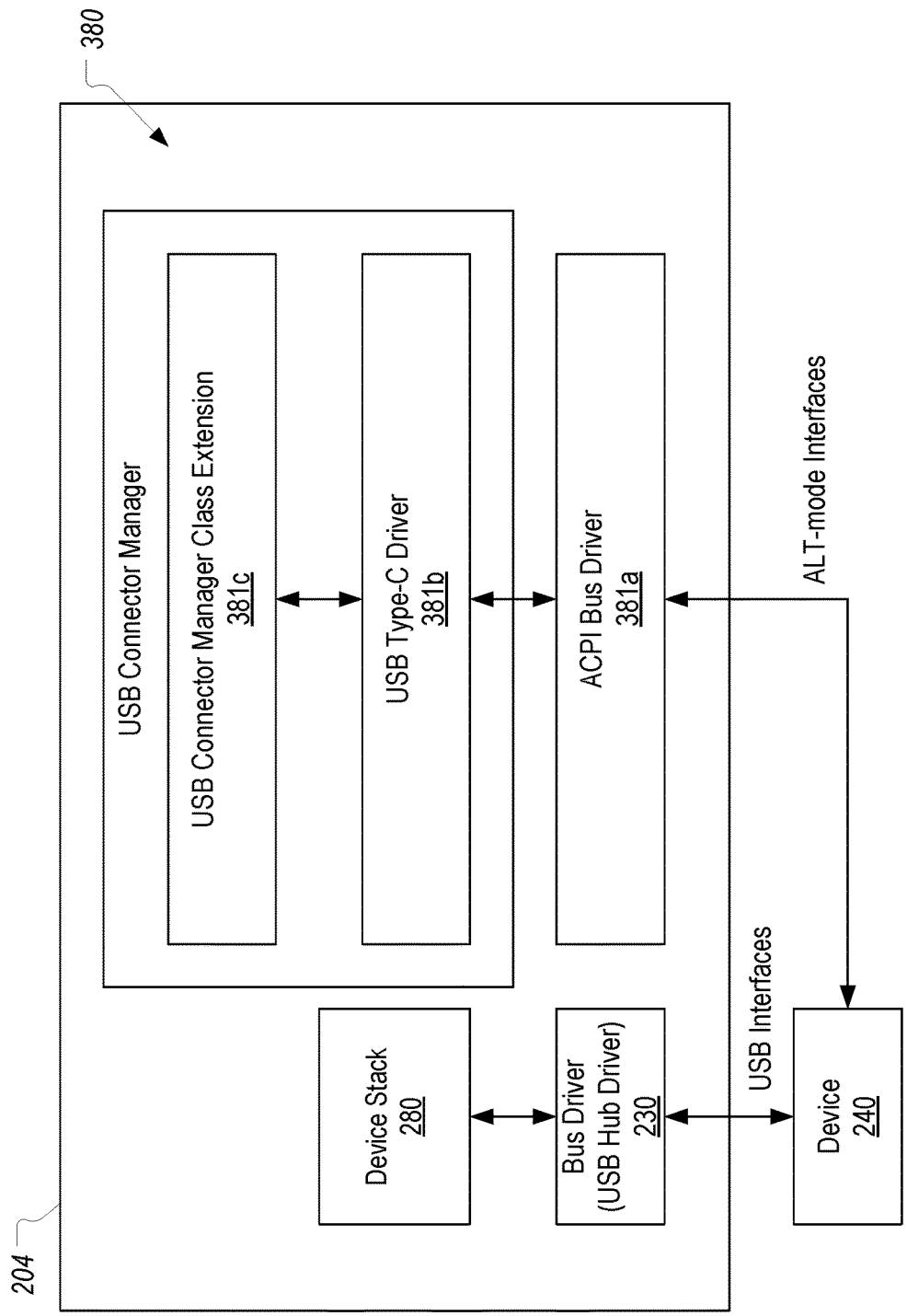
FIG. 3A is based on FIG. 2A but represents the architecture that may exist when the locally connected USB device is a USB Type-C device.

FIGS. 4A-4F illustrate how a filter driver 400 can be incorporated into the architecture shown in FIG. 3 or 3A to enable it to prevent discovery of alternate modes that a USB Type-C device supports but that are not allowed. As shown, filter driver 400 is positioned between USB Type-C driver 381b and ACPI bus driver 381a.

Figure 4A:
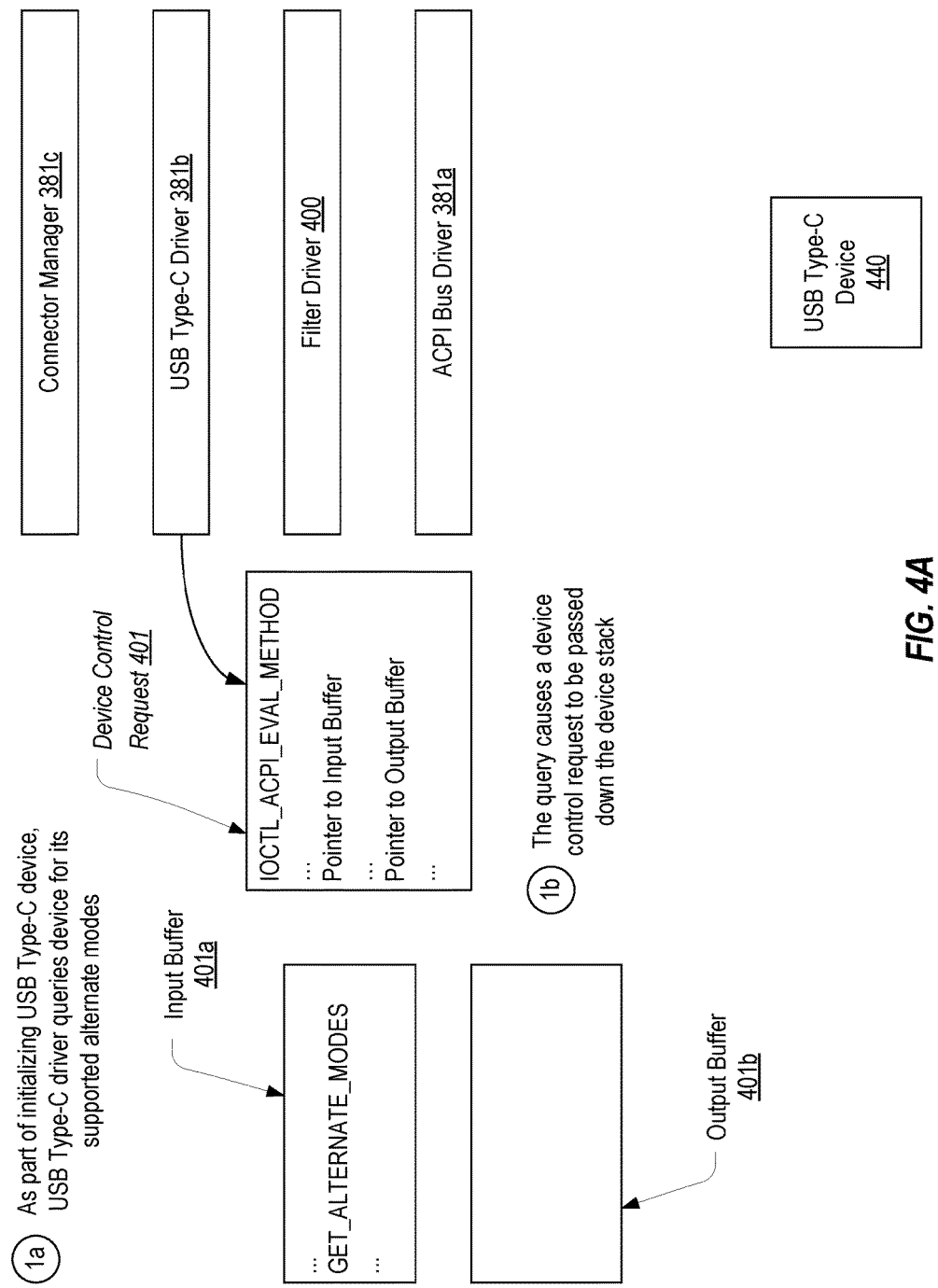
FIGS. 4A-4F illustrate a technique by which a filter driver can prevent discovery of alternate modes that a USB Type-C device supports.

FIG. 4A represents processing that USB Type-C driver 381b will perform while initializing a USB Type-C device 440 whether it is locally connected or redirected. As represented in step 1a, as part of the initialization process, USB Type-C driver 381b will query USB Type-C device 440 for its supported alternate modes. In accordance with the UCSI, this can be accomplished using the GET_ALTERNATE_MODES command. In a Windows implementation, USB Type-C driver 381b can issue the GET_ALTERNATE_MODES command by calling the IoBuildDeviceIoControlRequest function to create a device control request 401 having an I/O control code (IOCTL) of IOCTL_ACPI_EVAL_METHOD. As is known, this IOCTL can be employed to evaluate an ACPI control method and is currently the technique by which a USB Type-C driver communicates with a USB Type-C device via the ACPI. Device control request 401 will include pointers to an input buffer 401a and an output buffer 401b. As shown, the GET_ALTERNATE_MODES command will be specified in input buffer 401a (which may be in the form of an ACPI_EVAL_INPUT_BUFFER_COMPLEX structure). Device control request 401 will then be passed down the device stack in step 1b.

Figure 4B:
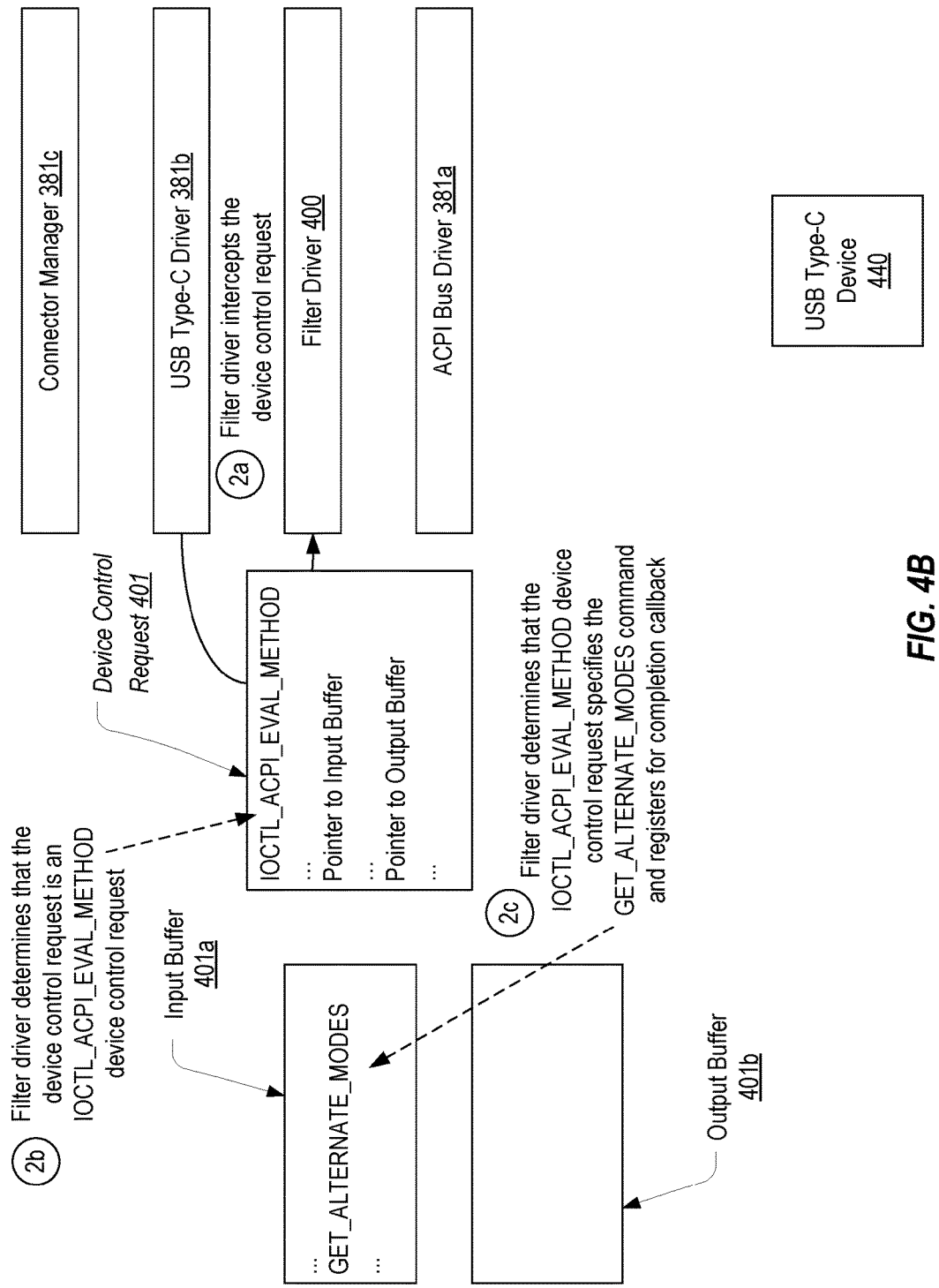

As shown in FIG. 4B, in step 2a, filter driver 400 will intercept device control request 401 and can evaluate its contents. In step 2b, filter driver 400 determines that device control request 401 is an IOCTL_ACPI_EVAL_METHOD request (e.g., by reading the IOCTL). Also, in step 2c, filter driver 400 determines that device control request 401 includes the GET_ALTERNATE_MODES command (e.g., by reading the method name defined in the ACPI_EVAL_INPUT_BUFFER_COMPLEX structure stored in input buffer 401a). Because device control request 401 is a query for supported alternate modes, filter driver 400 can register to be called back upon completion of device control request 401.

Figure 4C:
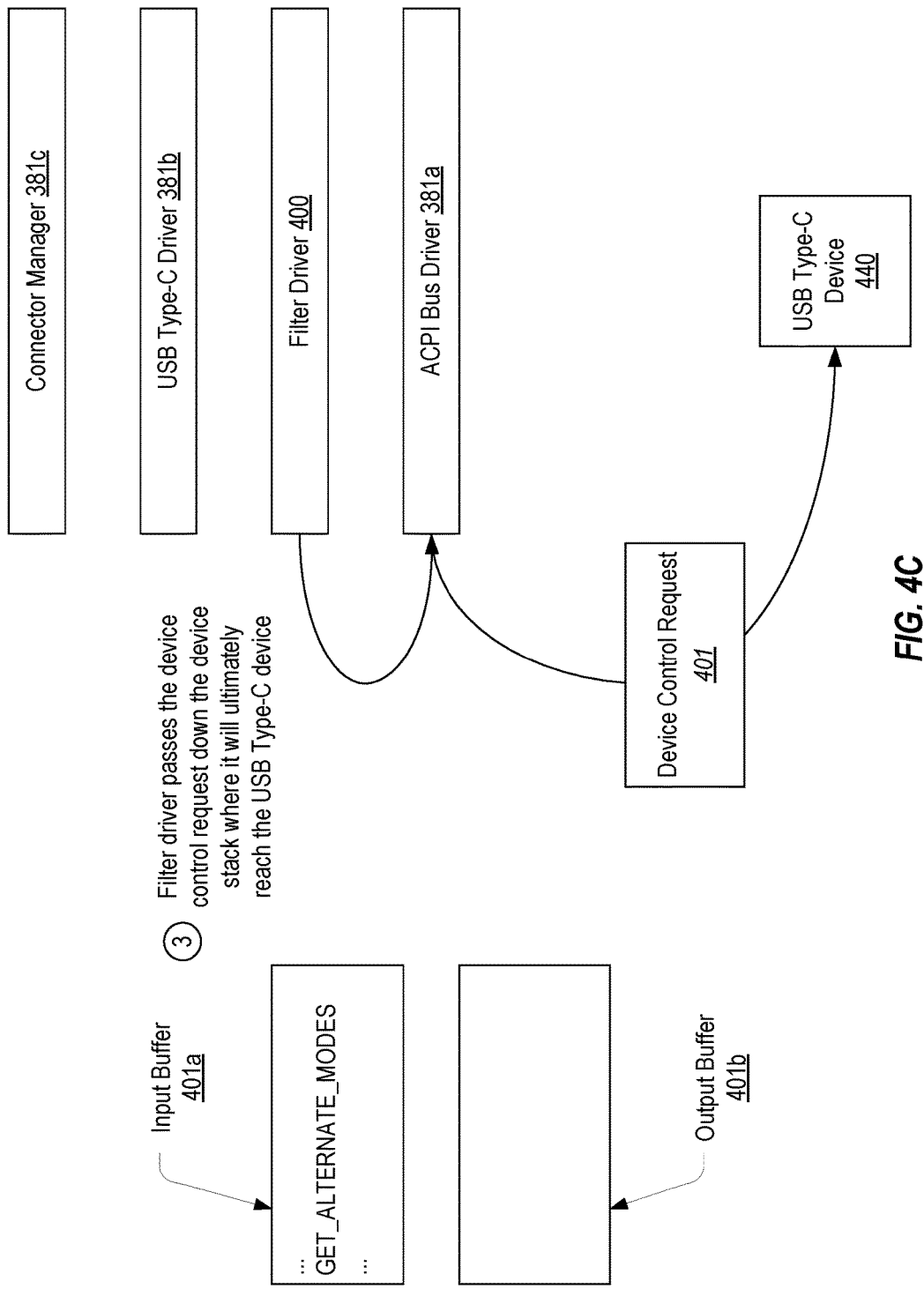
Figure 4D:
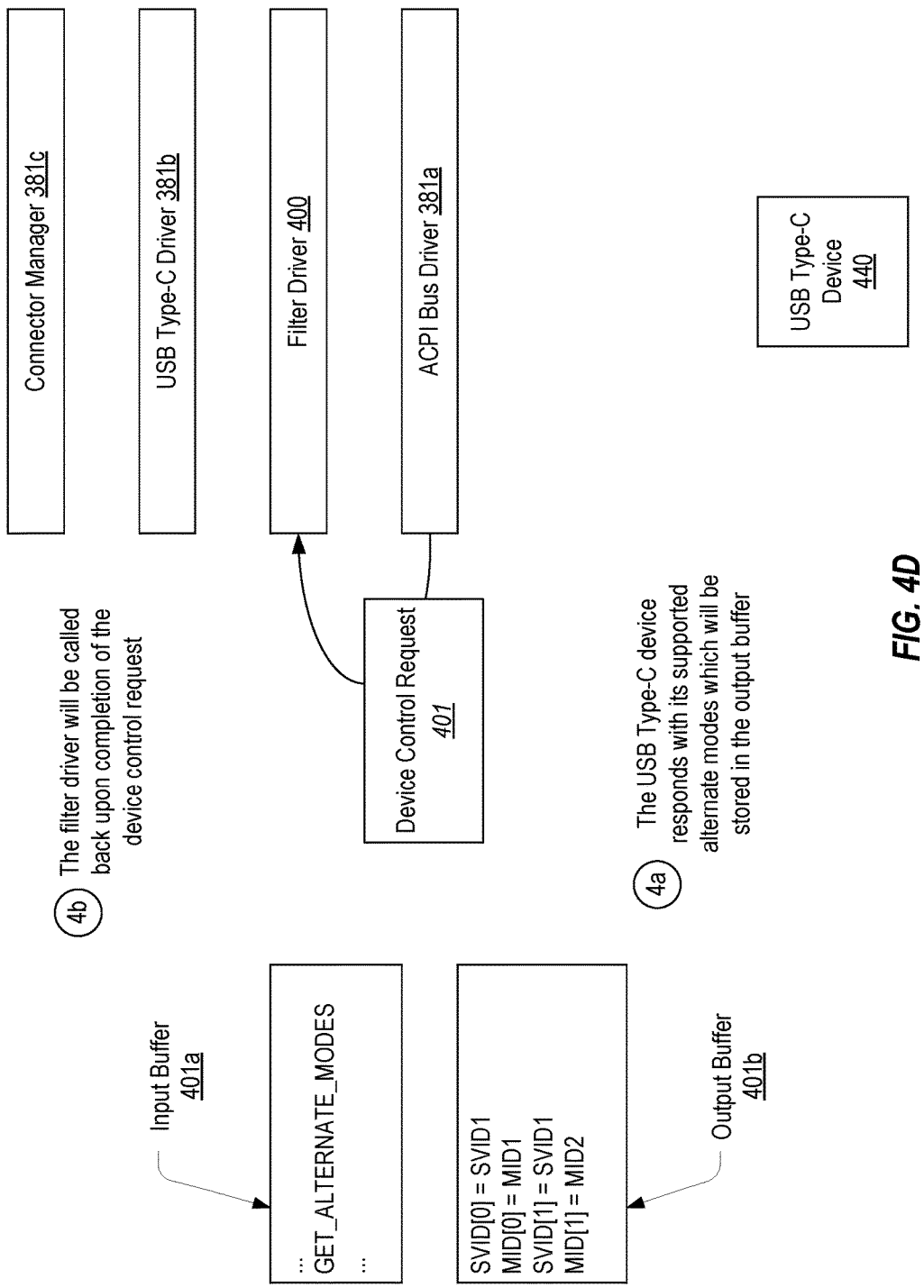

Next, in step 3 shown in FIG. 4C, filter driver 400 will pass device control request 401 down the device stack where it will ultimately reach USB Type-C device 440. The on-board controller of USB Type-C device 440 will respond with a listing of the supported alternate modes. In accordance with the UCSI, each supported alternate mode will be defined by the combination of a 16 bit Standard or Vendor ID (SVID) and a 32 bit Mode ID (MID). Step 4a of FIG. 4D shows that this listing of supported alternate modes has been stored in output buffer 401b (which may be in the form of an ACPI_EVAL_OUTPUT_BUFFER). For simplicity, it will be assumed that USB Type-C device 440 supports two alternate modes as shown in FIG. 4D. Because filter driver 400 registered to be called back, after ACPI bus driver 381a has completing its processing of device control request 401 (which would entail populating output buffer 401b), filter driver 400 will have the opportunity in step 4b to process device control request 401 before it is passed on to USB Type-C driver 381b.

Figure 4E:
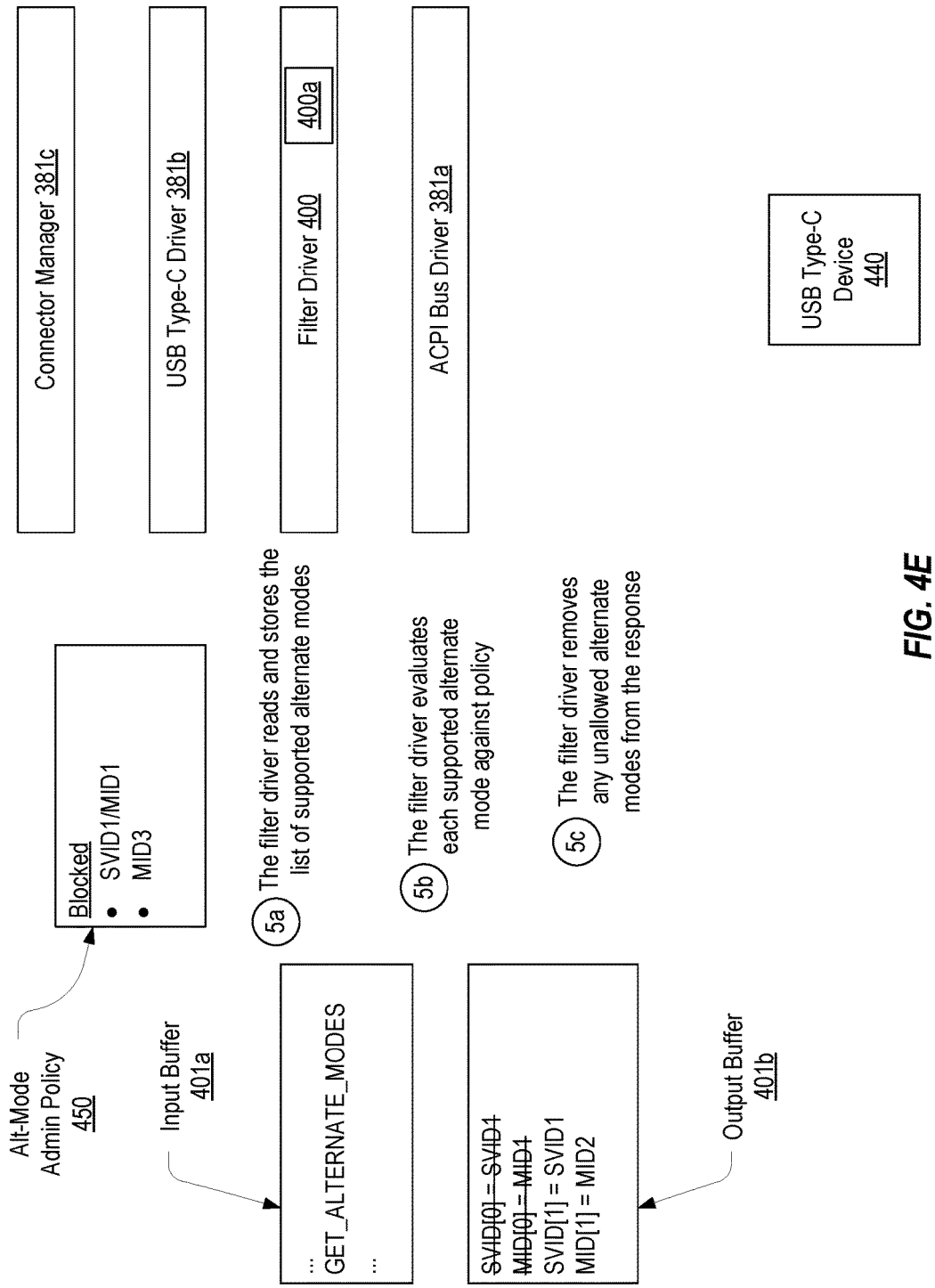

Turning to FIG. 4E, in step 5a, filter driver 400 can extract the contents of output buffer 401b in order to evaluate each supported alternate mode listed in the response. Filter driver 400 can retain a copy of this unmodified listing 400a of the supported alternate modes. In step 5b, filter driver 400 evaluates each supported alternate mode against an alternate mode admin policy 450. Policy 450 allows an administrator to selectively allow or block a particular alternate mode based on any type or number of conditions including the identity of the current user and/or the type of user session (e.g., local or remote). Alternatively, filter driver 400 could be configured to block all alternate modes in which case a policy would not be necessary.

In this example, policy 450 indicates that an alternate mode having an SVID of SVID1 and an MID of MID1 and an alternate mode having an MID of MID3 should be blocked. Therefore, based on policy 450, filter driver 400 can remove the first alternate mode in the listing of supported alternate modes in step 5c. In other words, filter driver 400 can modify the contents of output buffer 401b so that the listing of supported alternate modes includes only the alternate mode having an SVID of SVID1 and an MID of MID2. This modification will cause it to appear as if USB Type-C device 440 supports only a single alternate mode when in fact it supports two. Although not shown, filter driver 400 can also update other contents of output buffer 401b as necessary so that all the contents are consistent (e.g., by updating the GET_ALTERNATE_MODES status in the USCI CCI data structure). Also, filter driver 400 can update unmodified listing 400a to include an indication of which alternate modes have been blocked for reasons that will be described below.

Figure 4F:
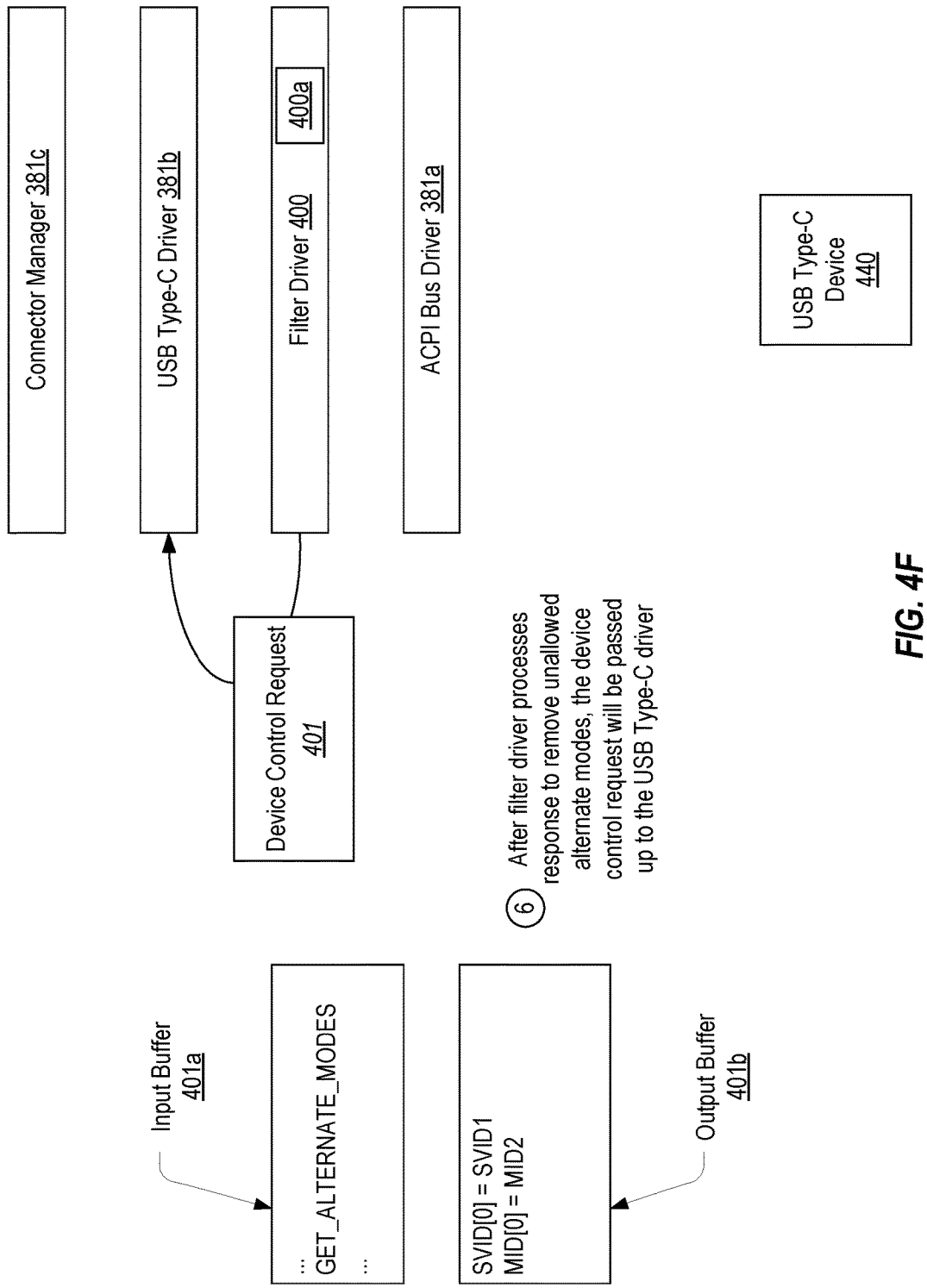

Finally, in step 6 shown in FIG. 4F, filter driver 400 can pass device control request 401 on to USB Type-C driver 381b. Upon reviewing the response, USB Type-C driver 381b will determine that USB Type-C device 440 only supports a single alternate mode. Therefore, the supported yet not allowed alternate mode will not be presented for use on the computing device.

The UCSI provides another command by which supported alternate modes can be determined. The GET_CAM_SUPPORTED command, which should be issued after the GET_ALTERNATE_MODES command, works in conjunction with the GET_ALTERNATE_MODES command by providing an indication of whether each of the supported alternate modes as reported by the GET_ALTERNATE_MODES command is currently supported (i.e., currently available for use). The currently supported alternate modes may be a subset of the supported alternate modes returned by the GET_ALTERNATE_MODES command if resources necessary for providing a particular alternate mode are not currently available. FIG. 5A-5D illustrate how filter driver 400 can prevent discovery of alternate modes when the GET_CAM_SUPPORTED command is used.

Figure 5A:
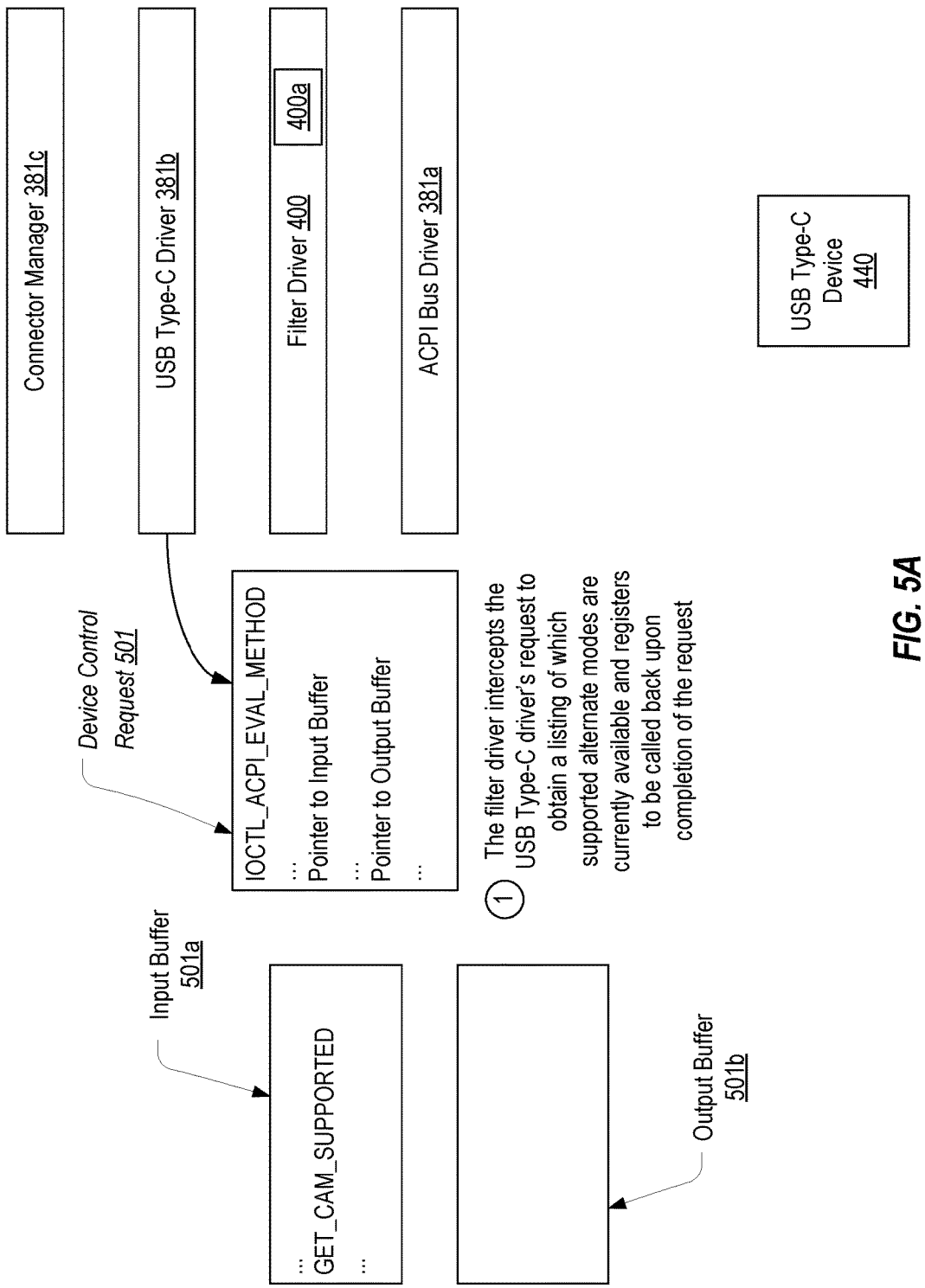
FIGS. 5A-5D illustrate another technique by which a filter driver can prevent discovery of alternate modes that a USB Type-C device supports.

As shown in FIG. 5A as step 1, USB Type-C driver 381b can issue the GET_CAM_SUPPORTED command as part of a device control request 501 in much the same manner as described above (e.g., using IoBuildIoControlRequest). Importantly, in this case, input buffer 501a includes the GET_CAM_SUPPORTED command rather than the GET_ALTERNATE_MODES command. As described above, filter driver 400 can examine device control request 501 to determine that it is an IOCTL_ACPI_EVAL_METHOD request and can also examine input buffer 501a to determine that it specifies the GET_CAM_SUPPORTED command. Upon making these determinations, filter driver 400 can register for completion callback.

Figure 5B:
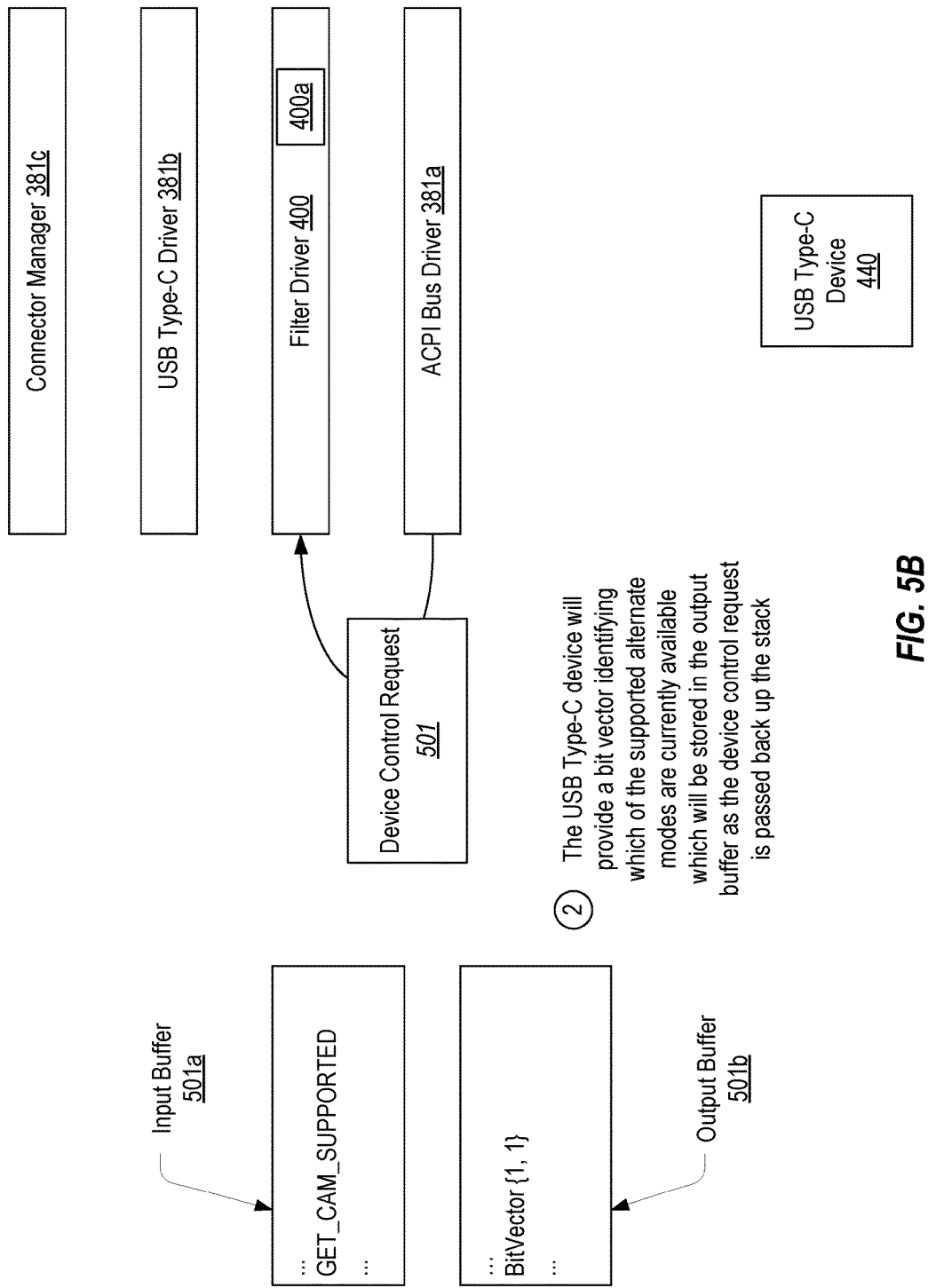

Device control request 501 will then be passed down to USB Type-C device 440 which will provide a UCSI-compliant response that includes a bit vector defining whether each of the previously reported alternate modes is currently supported (i.e., currently available for use) as represented in step 2 of FIG. 5B. In this example, it will be assumed that both of the alternate modes that USB Type-C device 440 supports are currently supported. Therefore, the bit vector in output buffer 501b will include an indication that both alternate modes are currently supported (a value of 1 in this example is assumed to define that the corresponding alternate mode is currently supported). The order of the bits in the bit vector will match the order in which the supported alternate modes were previously reported in response to the GET_ALTERNATE_MODES command.

Figure 5C:
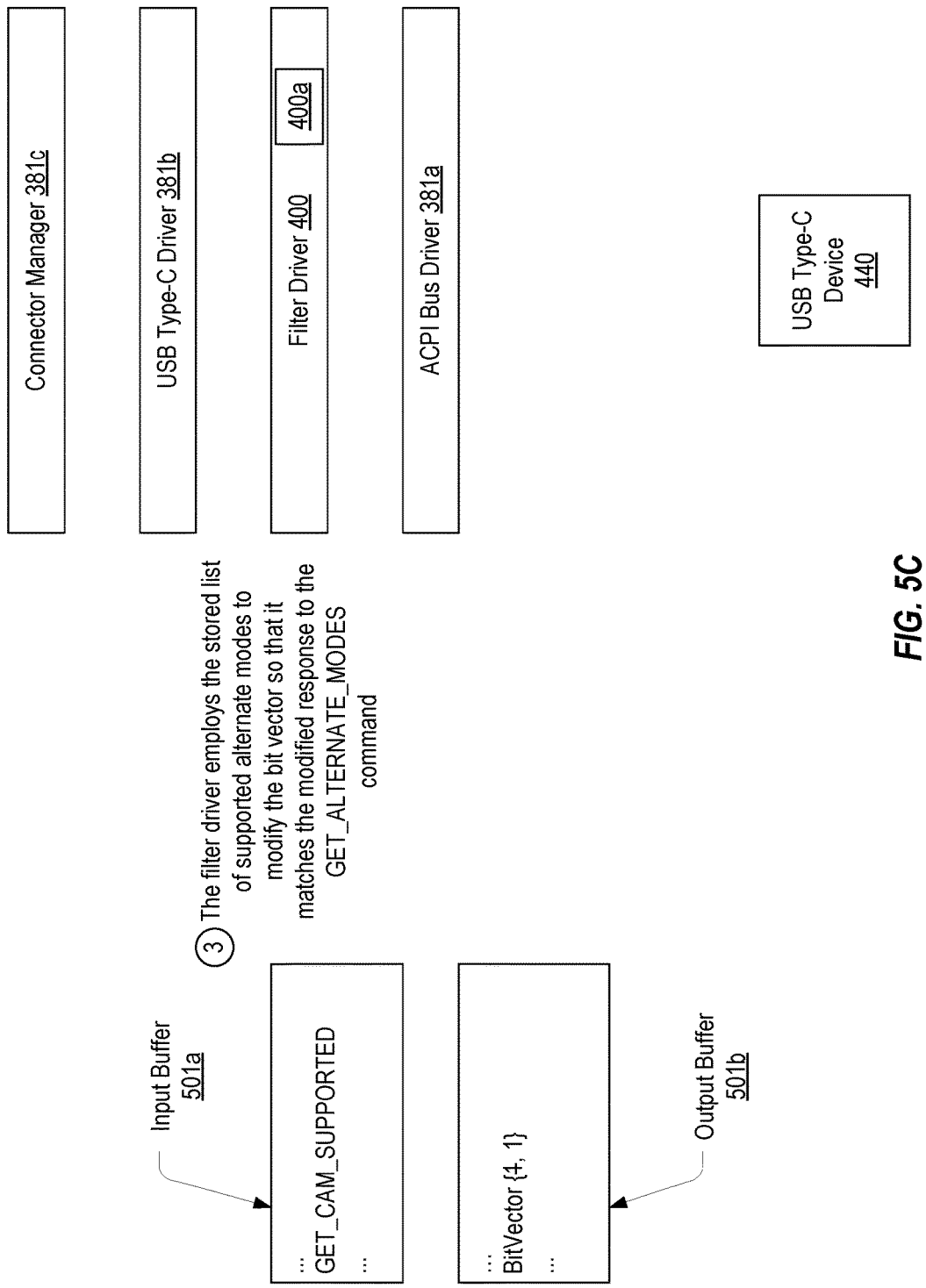

Turning to FIG. 5C, because filter driver 400 registered to be called back upon completion of device control request 501, it will have the opportunity to process the GET_CAM_SUPPORTED response before it reaches USB Type-C driver 381b. As represented in step 3, filter driver 400 can update the bit vector to remove any bits that correspond to an alternate mode that was removed from the GET_ALTERNATE_MODE response. In other words, in this step, filter driver 400 ensures that the GET_CAM_SUPPORTED response is consistent with the modified GET_ALTERNATE_MODE response. Otherwise, the bit vector with 2 bits would represent to USB Type-C driver 381b that USB Type-C device 440 supports two alternate modes.

One way in which filter driver 400 may update the bit vector to be consistent with the modified GET_ALTERNATE_MODE response is by employing unmodified listing 400a of the supported alternate modes. As mentioned above, listing 400a, which lists the supported alternate modes in the order that they were reported, can include an indication of whether a particular supported alternate mode was blocked. Using such indications and based on the ordering of the alternate modes in listing 400a, filter driver 400 can remove, from the bit vector, each bit that corresponds to a blocked alternate mode. In this example, the alternate mode at position 0 was blocked, and therefore, filter driver 400 can remove the bit at position 0 in the bit vector.

Figure 5D:
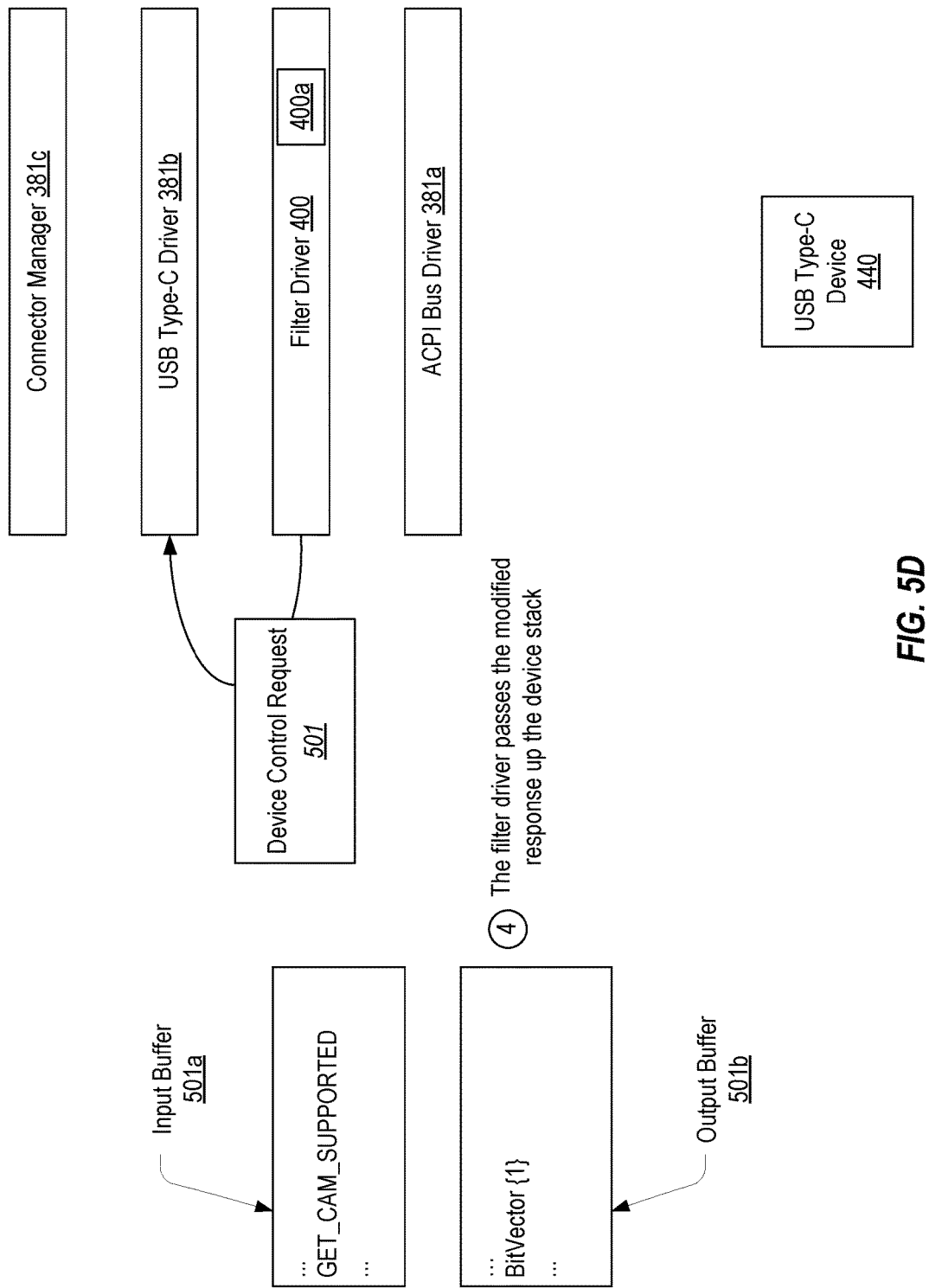

After updating the bit vector and making any other necessary changes to the contents of output buffer 501b to ensure consistency, filter driver 400 can pass device control request 501 on to USB Type-C driver 381b as shown in FIG. 5D as step 4. Due to filter driver 400's processing, the bit vector includes only a single bit which is consistent with the modified GET_ALTERNATE_MODES response that USB Type-C driver 381b would have previously received. Therefore, even after the GET_CAM_SUPPORTED command, USB Type-C driver 381b will still report that USB Type-C device 440 provides a single alternate mode.

Figure 6A:
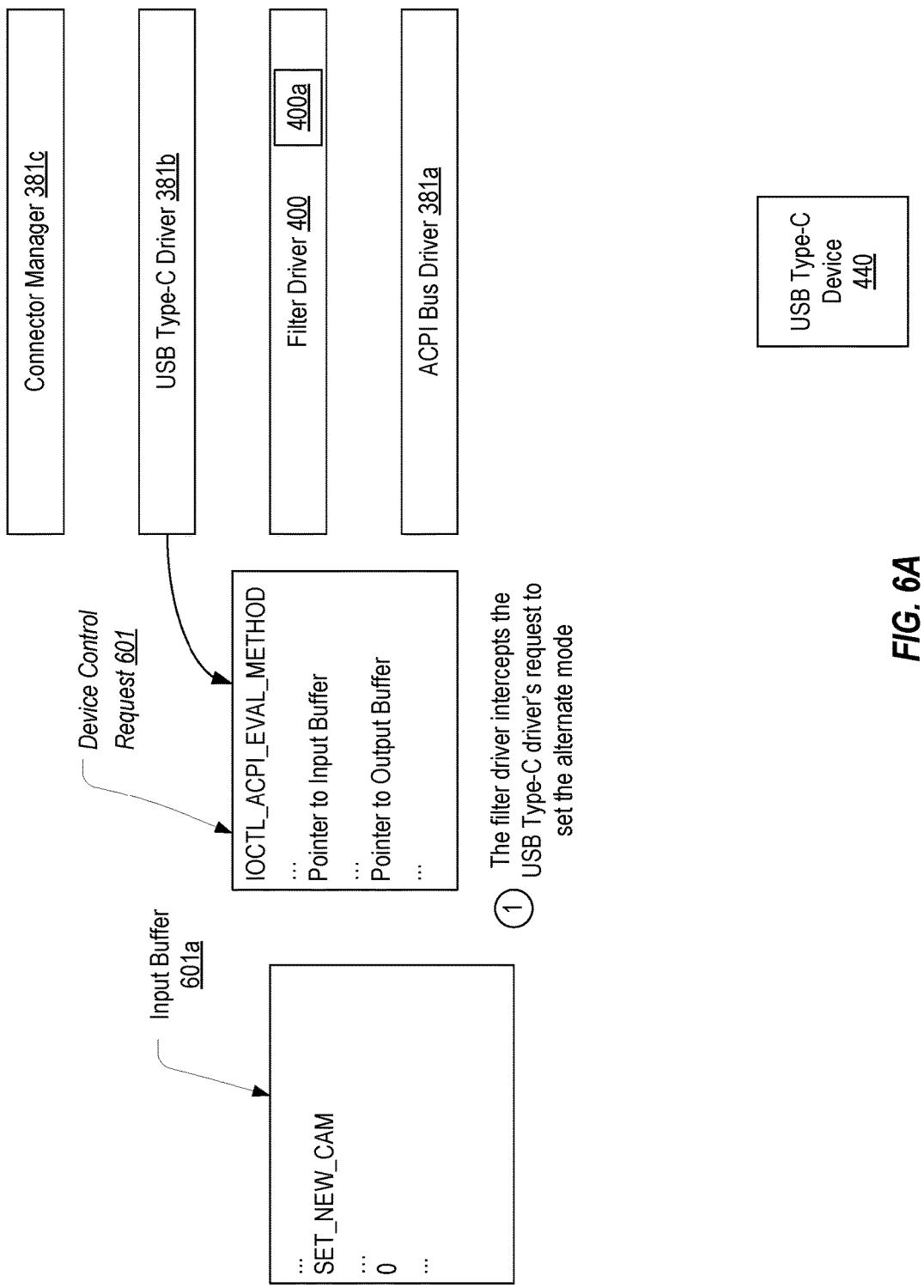
FIGS. 6A and 6B illustrate a technique by which a filter driver can selectively enable access to an alternate mode of a USB Type-C device.
Figure 6B:
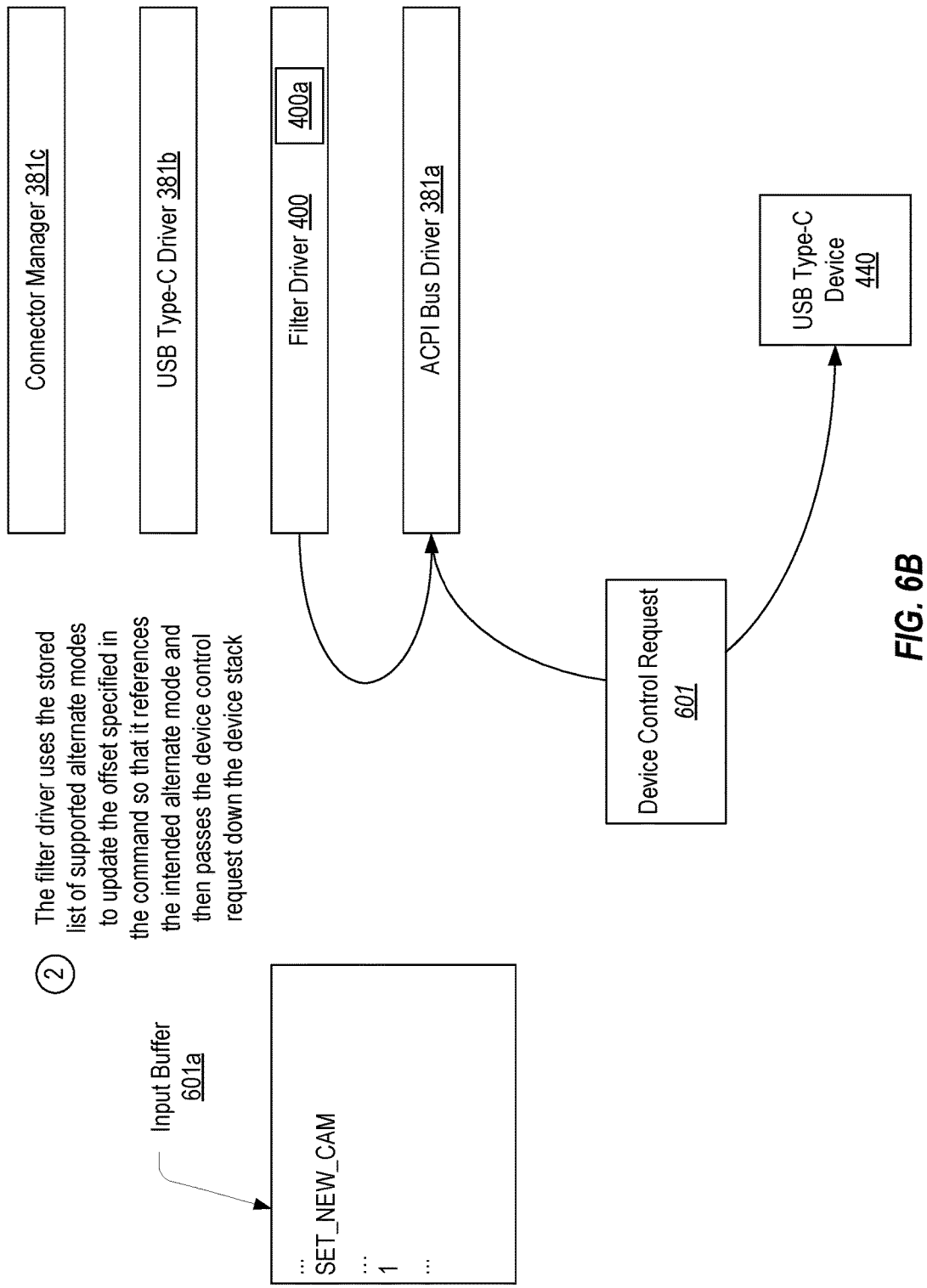

When it is desired to set a USB Type-C device to use an alternate mode, the UCSI defines that the SET_NEW_CAM command should be used. Within this command, the desired alternate mode is specified using an offset into the list of alternate modes that was reported in the GET_ALTERNATE_MODES response. In instances where filter driver 400 blocks a supported alternate mode, the list of alternate modes the USB Type-C driver 381b maintains will not match the actual listing of supported alternate modes. Therefore, filter driver 400 can be configured to modify a SET_NEW_CAM request. FIGS. 6A and 6B represent how filter driver 400 can process a device control request 601 that specifies the SET_NEW_CAM command.

As shown in step 1 of FIG. 6A, USB Type-C driver 381b can create device control request 601 (e.g., using IoBuildIoControlRequest). Device control request 601 is also an IOCTL_ACPI_EVAL_METHOD request and includes an input buffer 601*a* storing an ACPI_EVAL_INPUT_ BUFFER_COMPLEX structure which defines the SET_ NEW_CAM command and an index of 0. From the perspective of USB Type-C driver 381*b*, this index of 0 corresponds with the alternate mode having an SVID of SVID1 and an MID of MID2. In reality, however, the alternate mode having an SVID of SVID1 and an MID of MID1 is at index 0. Therefore, if filter driver were to allow device control request 601 to be passed down unchanged, the wrong alternate mode, which is not an allowed alternate mode, would be requested.

Having stored unmodified list 400*a* of the supported alternate modes, filter driver 400 can determine whether the specified index in the SET_NEW_CAM command should be modified. In this example, and as represented in step 2 of FIG. 6B, filter driver 400 can update the index to 1 so that it matches the intended alternate mode and then pass device control request 601 down the device stack. More specifically, list 400*a* will indicate that the first allowed alternate mode (index 0 from the perspective of USB Type-C driver 381*b*) is the second supported alternate mode (index 1).

In some cases, filter driver 400 can block a SET_NEW_ CAM command rather than modify its index. For example, with reference to FIG. 6A, if the index specified by USB Type-C driver 381*b* had been 1 or 2 instead of 0 (which could be the result of a malicious attempt to access USB Type-C device 440), filter driver 400 would determine that the specified index does not match an allowed alternate mode even though it would match a supported alternate mode of USB Type-C device 440. Again, this determination can be made by evaluating the specified index against listing 400*a*. In this example, listing 400*a* would indicate that only a single supported alternate mode was reported to USB Type-C driver 381*b* and therefore any SET_NEW_CAM command with an index above 0 should be blocked.

Figure 7A:
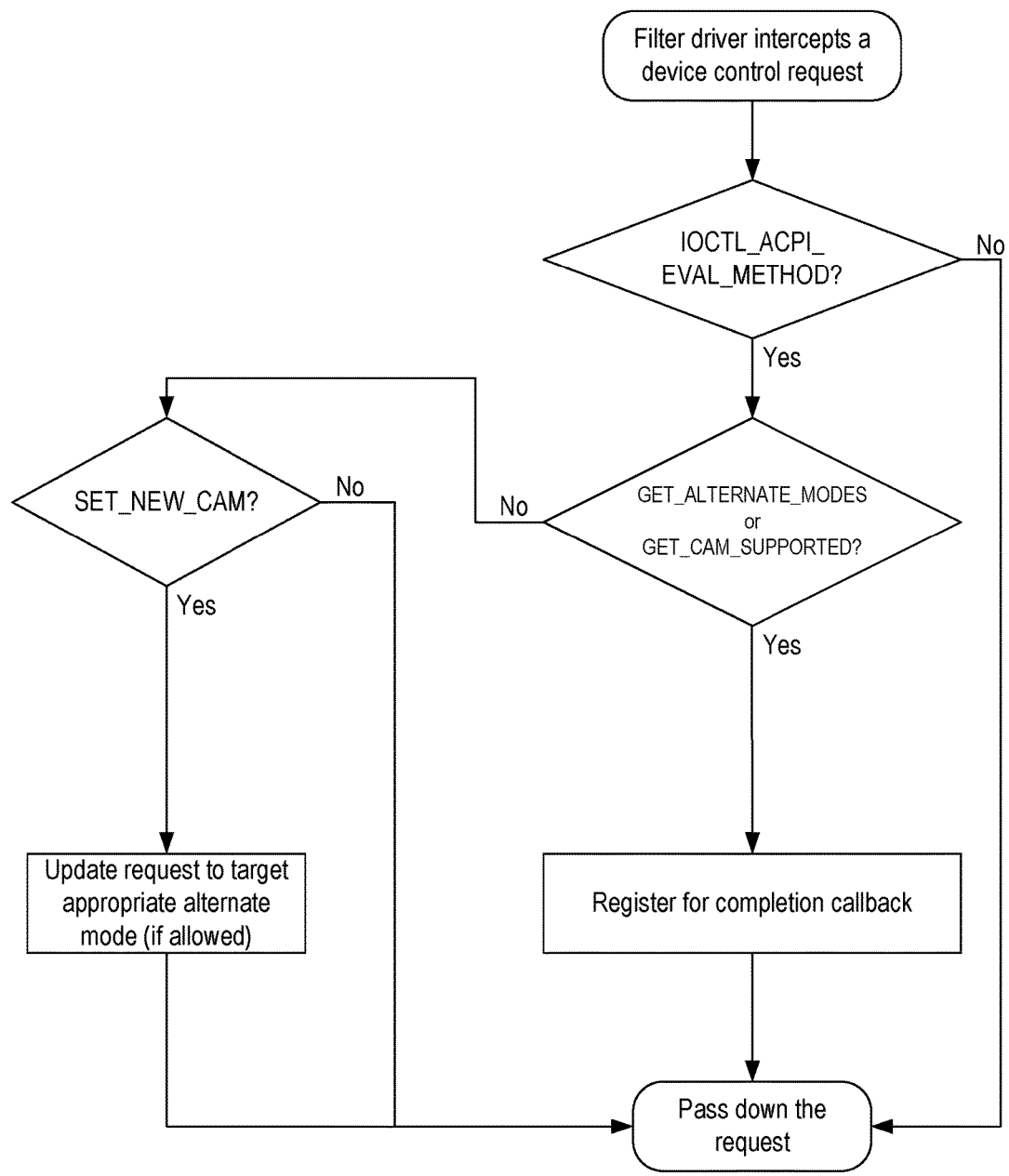
FIGS. 7A and 7B provide flow diagrams that correspond with the techniques shown in FIGS. 4A-6B.

FIG. 7A provides a flow diagram representing how filter driver 400 can handle device control requests that it receives. Upon intercepting a device control request, filter driver 400 can determine whether the device control request is an IOCTL_ACPI_EVAL_METHOD request. If so, filter driver 400 can determine whether the device control request specifies the GET_ALTERNATE_MODES or GET_CAM_ SUPPORTED commands, and if so, can register to be called back once the commands are completed. If the device control request does not specify either of these two commands, filter driver 400 can then determine whether the device control request specifies the SET_NEW_CAM command. If so, filter driver 400 can update the SET_NEW_ CAM command to target the appropriate alternate mode and then pass the device control request down the device stack. Although not shown, filter driver 400 could block the SET_NEW_CAM command in some instances as described above.

Figure 7B:
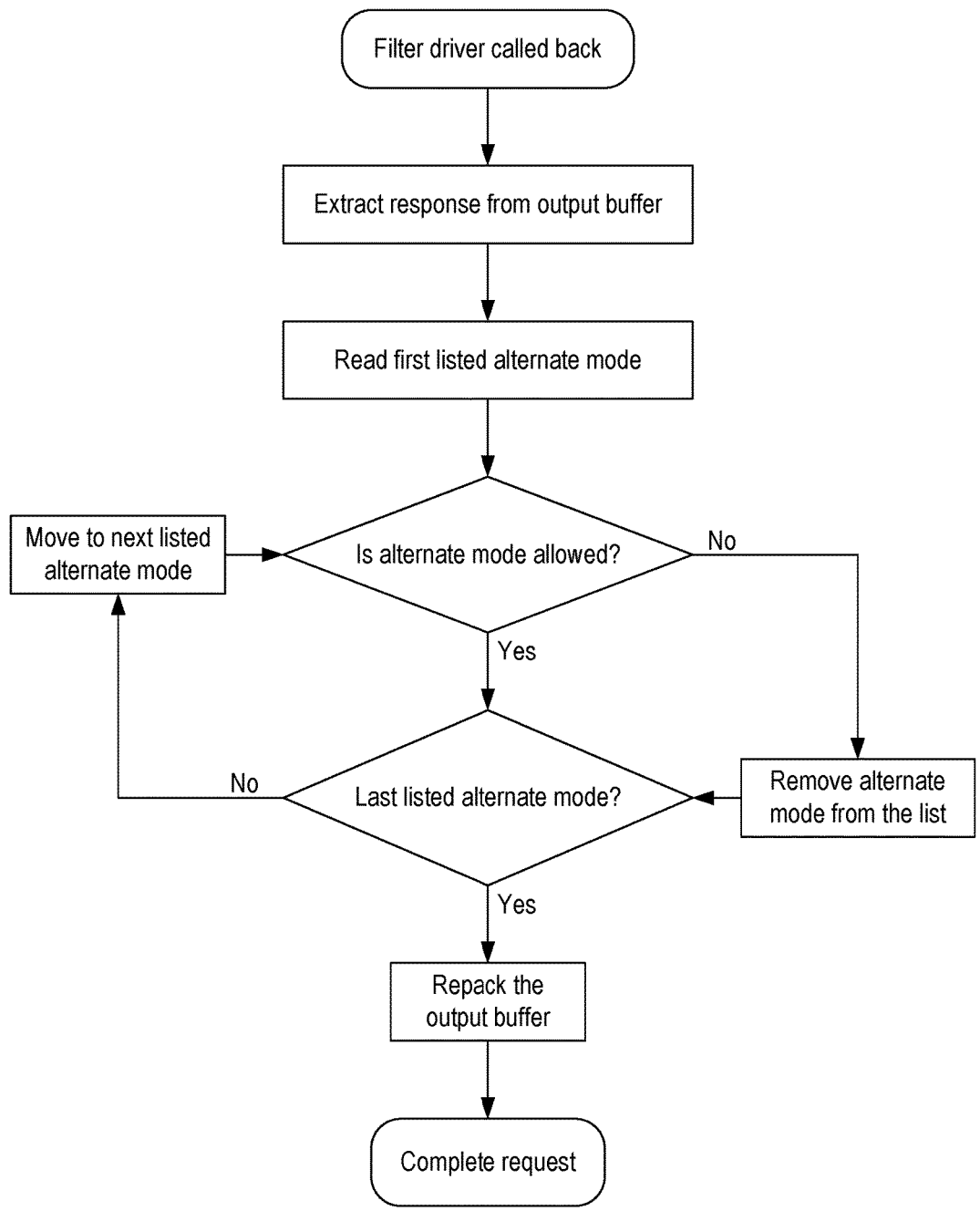

FIG. 7B provides a flow diagram representing how filter driver 400 can handle device control requests that specify the GET_ALTERNATE_MODES command once such commands have been completed. When filter driver 400 is called back, it can extract the contents of the output buffer (e.g., the ACPI_EVAL_OUTPUT_BUFFER which would contain the GET_ALTERNATE_MODES status and GET_ALTERNATE_MODES data in the UCSI CCI and MESSAGE IN data structures respectively). Filter driver 400 can then iterate through each listed alternate mode to determine whether it is allowed. Filter driver 400 can remove any unallowed alternate mode from the list and then repack the output buffer with the modified list that only includes allowed alternate modes. Filter driver 400 can then complete the device control request allowing it to be passed up to the USB Type-C driver.

Although not shown in the figures, the process of FIG. 7B can be performed multiple times when the USB device supports more than two alternate modes. In accordance with the UCSI, each GET_ALTERNATE_MODES command returns up to two supported alternate modes such that the USB Type-C driver will have to issue the GET_ALTER- NATE_MODES command multiple times when there are more than two supported alternate modes. Even in such cases, filter driver 400 will still perform the same process but can augment list 400*a* with each subsequent command.

Figure 8:
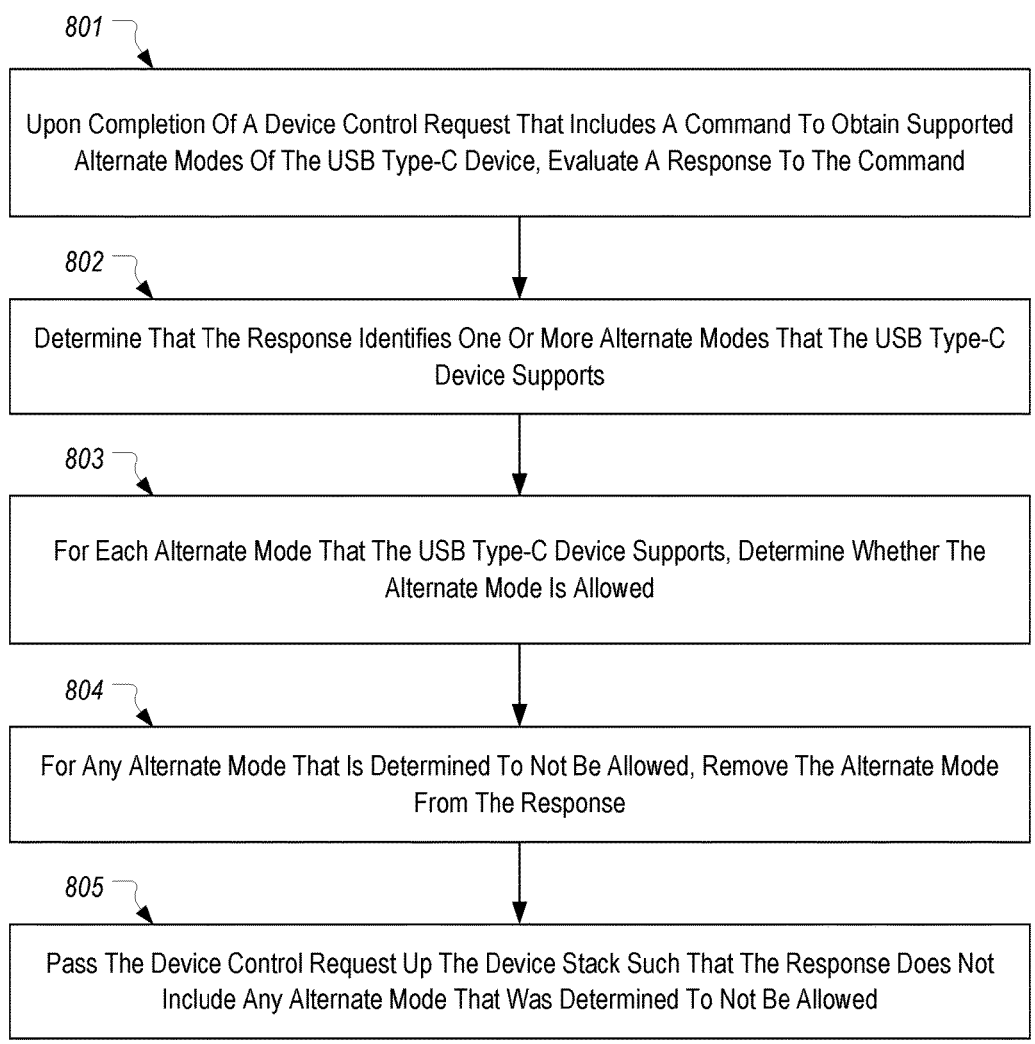
FIG. 8 provides a flowchart of an example method for managing alternate modes of a USB Type-C device.

FIG. 8 provides a flowchart of an example method 800 for managing alternate modes of the USB Type-C device. Method 800 could be performed by filter driver 400 to manage the alternate modes of USB Type-C device 440.

Method 800 includes an act 801 of, upon completion of a device control request that includes a command to obtain supported alternate modes of the USB Type-C device, evaluating a response to the command. For example, filter driver 400 can evaluate the contents of the ACPI_EVAL_OUTPUT_BUFFER structure contained in output buffer 401*b* after device control request 401 has been completed.

Method 800 includes an act 802 of determining that the response identifies one or more alternate modes that the USB Type-C device supports. For example, filter driver 400 can determine that USB Type-C device 400 has indicated that it supports alternate modes represented by SVID1/ MID1 and SVID1/MID2.

Method 800 includes an act 803 of, for each alternate mode that the USB Type-C device supports, determining whether the alternate mode is allowed. For example, filter driver 400 can compare each supported alternate mode to policy 450.

Method 800 includes an act 804 of, for any alternate mode that is determined to not be allowed, removing the alternate mode from the response. For example, filter driver 400 can remove the first listed supported alternate mode since policy 450 indicates that the SVID1/MID1 alternate mode should be blocked.

Method 800 includes an act 805 of passing the device control request up the device stack such that the response does not include any alternate mode that was determined to not be allowed. For example, filter driver 400 can complete its handling of device control request 401 after removing the first listed alternate mode.

In summary, the present invention provides a way to manage the alternate modes that a USB Type-C device supports. This management is performed below the USB Type-C driver and therefore can be performed in a manner that is substantially transparent to the higher level components of the host system. The present invention can therefore enhance security of and the administrative control over USB Type-C devices.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media.

Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a filter driver in a device stack for a USB Type-C device, for managing alternate modes of the USB Type-C device, the method comprising:
    upon completion of a device control request that includes a command to obtain supported alternate modes of the USB Type-C device, evaluating a response to the command;
    determining that the response identifies one or more alternate modes that the USB Type-C device supports;
    for each alternate mode that the USB Type-C device supports, determining whether the alternate mode is allowed;
    for any alternate mode that is determined to not be allowed, removing the alternate mode from the response; and
    passing the device control request up the device stack such that the response does not include any alternate mode that was determined to not be allowed.

2. The method of claim 1, wherein the command to obtain supported alternate modes is the GET_ALTERNATE_MODES command of the USB Type-C Connector System Software Interface.

3. The method of claim 1, wherein determining that the response identifies one or more alternate modes that the USB Type-C device supports comprises extracting contents of an output buffer associated with the device control request.

4. The method of claim 1, wherein determining whether the alternate mode is allowed comprises comparing the alternate mode to an administrative policy.

5. The method of claim 4, wherein the administrative policy identifies allowed or unallowed alternate modes using one or both of a standard or vendor ID of the USB Type-C device or a mode ID of the alternate mode.

6. The method of claim 4, wherein the administrative policy is selected based on one or more of:
    an identity of a user; or
    a type of user session.

7. The method of claim 1, further comprising:
    storing a listing of the one or more alternate modes that the USB Type-C device supports.

8. The method of claim 6, wherein storing the listing comprises storing an indication of any alternate mode that was removed from the response.

9. The method of claim 8, wherein the command is a first command, the method further comprising:
    upon completion of a device control request that includes a second command to obtain currently supported alternate modes of the USB Type-C device, evaluating a response to the second command;
    determining that the response to the second command provides a value for each of the one or more alternate modes that the USB Type-C device supports, the value identifying whether the corresponding alternate mode is currently supported;
    removing, from the response to the second command, each value that corresponds to an alternate mode that was removed from the response to the first command;
    passing the device control request that includes the second command up the device stack such that the response to the second command does not include any value that corresponds to an alternate mode that was removed from the response to the first command.

10. The method of claim 9, wherein the second command is the GET_CAM_SUPPORTED command of the USB Type-C Connector System Software Interface.

11. The method of claim 9, wherein removing, from the response to the second command, each value that corresponds to an alternate mode that was removed from the response to the first command comprises accessing a listing of the one or more alternate modes that the USB Type-C device supports that was stored by the filter driver, the listing including an indication of any alternate mode that was removed from the response.

12. The method of claim 1, further comprising:
    receiving a device control request that includes a command to set a particular alternate mode of the USB Type-C device, the particular alternate mode being identified by an index; and
    modifying the index.

13. The method of claim 12, wherein modifying the index includes:
    accessing a listing of the one or more alternate modes that the USB Type-C device supports that was stored by the filter driver, the listing including an indication of any alternate mode that was removed from the response; and modifying the index in accordance with the indication of any alternate mode that was removed from the response.

14. The method of claim 1, receiving a device control request that includes a command to set a particular alternate mode of the USB Type-C device, the particular alternate mode being identified by an index; and failing the device control request based on the index.

15. A method, performed by a filter driver in a device stack for a USB Type-C device, for managing alternate modes of the USB Type-C device, the method comprising:

receiving a device control request;

determining that the device control request includes a command to obtain supported alternate modes of the USB Type-C device;

registering to be called back upon completion of the device control request;

upon completion of the device control request, comparing the supported alternate modes that were obtained from the USB Type-C device to a policy defining alternate modes that are to be allowed; and removing one or more supported alternate modes based on the policy prior to passing the device control request up the device stack.

16. The method of claim 15, wherein the policy defines alternate modes that are to be allowed using one or both of a standard or vendor ID of the USB Type-C device or a mode ID of the alternate mode.

17. The method of claim 15, further comprising:

receiving a second device control request;

determining that the second device control request includes a command to obtain currently supported alternate modes of the USB Type-C device;

registering to be called back upon completion of the second device control request;

upon completion of the second device control request, removing one or more values that define whether a particular alternate mode of the supported alternate modes is currently supported prior to passing the second device control request up the device stack, wherein the one or more values that are removed correspond to the one or more supported alternate modes that were removed.

18. The method of claim 17, wherein the first device control request includes the GET_ALTERNATE_MODES command and the second device control request includes the GET_CAM_SUPPORTED command.

19. The method of claim 17, further comprising:

receiving a third device control request;

determining that the third device control request includes a command to set an alternate mode of the USB Type-C device; and modifying the command to set the alternate mode based on the one or more supported alternate modes that were removed.

20. One or more computer storage media storing computer executable instructions which when executed by one or more processors implement a filter driver that is configured to perform a method for managing alternate modes of the USB Type-C device, the method comprising:

upon completion of a device control request that includes a command to obtain supported alternate modes of the USB Type-C device, evaluating a response to the command;

determining that the response identifies multiple alternate modes that the USB Type-C device supports;

determining that at least one of the supported alternate modes is not allowed;

removing the at least one alternate mode from the response; and passing the device control request up the device stack such that the response does not include the at least one alternate mode that was removed from the response.

* * * * *